United States Patent [19]

Kyllonen et al.

[11] Patent Number: 5,205,646
[45] Date of Patent: Apr. 27, 1993

[54] METHOD FOR CONVEYANCE OF CEMENT UNDER WATER TO FORM CONCRETE

[76] Inventors: David M. Kyllonen, 405 Snowflake Cir., Jeffersonville, Pa. 19403; Charles F. Kyllonen, 2592 Ashurst Rd., University Heights, Ohio 44118

[21] Appl. No.: 810,203

[22] Filed: Dec. 19, 1991

[51] Int. Cl.⁵ .................................................. B28C 5/06
[52] U.S. Cl. .................................... 366/3; 366/51; 405/222; 405/266; 106/639; 106/724; 106/802
[58] Field of Search .................... 366/1, 2, 6, 14, 15, 366/28, 30, 10, 348, 349; 106/639, 724, 802; 405/222, 226, 269

[56] References Cited

U.S. PATENT DOCUMENTS

| | | | |
|---|---|---|---|
| 2,307,741 | 1/1943 | Goldstein | 106/802 |
| 3,800,544 | 4/1974 | Nakanishi | 405/266 |
| 4,072,017 | 2/1978 | Shiraki | 405/269 |
| 4,126,470 | 11/1978 | Braun | 106/681 |
| 4,455,170 | 6/1984 | LeGrand | 106/724 |
| 4,618,376 | 10/1986 | Saternus | 366/2 |
| 4,759,632 | 7/1988 | Horiuchi | 366/2 |
| 4,892,410 | 1/1990 | Snow | 366/2 |
| 5,020,598 | 6/1991 | Cowan | 106/802 |

FOREIGN PATENT DOCUMENTS

| | | | |
|---|---|---|---|
| 0040019 | 3/1982 | Japan | 405/269 |
| 0068418 | 4/1982 | Japan | 405/269 |

*Primary Examiner*—Philip R. Coe
*Assistant Examiner*—Randall E. Chin
*Attorney, Agent, or Firm*—Robert Charles Beam

[57] ABSTRACT

This invention relates to the conveyance of cement under water to form concrete. The method claimed utilizes, inter alia, a positive displacement pump and feed pipe to convey unreacted cement, suspended in an environmentally safe and non-reactive liquid vehicle or carrier (polyethyleneglycol, for example), to an underwater site comprised of a hydrated aggregate mass (usually sand), permitting said carrier to diffuse from said suspension into surrounding water and further permitting said cement to react with water in the aggregate thereby causing the cement, water and aggregate mixture to form concrete.

4 Claims, 1 Drawing Sheet

METHOD FOR CONVEYANCE OF CEMENT UNDER WATER TO FORM CONCRETE

BACKGROUND OF THE INVENTION

The present invention relates to the conveyance of cement through water to form concrete. Ordinarily, concrete is prepared by pre-mixing three basic elements: cement, water and aggregate. Controlled amounts of other substances are frequently added during mixing to impart special properties to the concrete. The mixture is subsequently conveyed to a designated site, where it is introduced into some type of form or mold and allowed to cure. In some instances, concrete must be used under water. Current methods of installing concrete under water generally involve preparation of the concrete mixture above the water, followed by placement of the mixture within a caisson or cofferdam, from which excess water must be excluded. Difficulties have been encountered including, inter alia, premature curing and/or the washing of the cement from the concrete mixture during placement.

DESCRIPTION OF THE PRIOR ART

Methods of placing concrete under water are well known in the prior art. Such methods include the use of pumps, underwater buckets, and pipes depending on the nature of the placement. Information on these methods has been published and is available in most technical libraries throughout the world and is well known to civil engineers. These methods involve placing pre-mixed concrete within caissons, cofferdams or forms. In each method, the concrete mixes are prepared above the water and must be prevented from coming in contact with the water during conveyance in order to prevent washing of the cement from the concrete mixture.

SUMMARY OF THE INVENTION

Objects and Advantages

This invention relates to the conveyance of cement through water to form concrete. The fundamental aspect of the methods claimed consists of the delivery of hydraulic cement of the aquatic floor, suspended in a nonreactive, environmentally safe liquid vehicle, into a hydrated aggregate mass, (e.g., sand). The cement then reacts with the hydrated aggregate to form concrete in situ. The present invention thus entails a method of simultaneous preparation and placement of a concrete mixture in underwater applications.

The liquid vehicle used to transport the hydraulic cement to the placement site must: 1) be nonreactive with respect to the cement; 2) be environmentally safe; and 3) not adversely affect the strength, plasticity and other properties of the hardened concrete if entrained therein. One of the polyethyleneglycols (PEGs) can be used; they do not react with hydraulic cement, they are environmentally safe, and they are capable of combining with the cement to form an easily mobile suspension. Furthermore, PEGs are miscible with water and are, therefore, capable of diffusing from the hydraulic cement after delivery to the placement site. PEGs do not impair the curing of the concrete mixture, nor do they adversely affect the physical properties of the final product.

PEGs have the general formula $HOCH_2(CH_2OCH_2)_n CH_2OH$ where n represents the average number of oxyethylene groups. PEGs are designated by a number that approximates the average molecular weight. PEG-200, for instance, has a molecular weight range of 190–210. When "PEG" is used in this document, it can be assumed to mean PEG-200, although other PEGs or other compounds that meet the stated requirements could be used.

The subject method has several uses of great significance. One practical application of the method lies in the prevention of coastal erosion. Eroding beaches can endanger near-shore structures or reduce the recreational value of a locality. The present method can be implemented at accrete sand in a particular area, thus stabilizing the shoreline. The same method can be used to prevent erosion of lake, river, stream or canal embankments and floors. Stabilization of the surface and subsurface regions of these and saltwater bodies can also improve navigation through or across same. The present method can also be used to immobilize certain toxic contaminants found in the sediment.

In describing the present invention, reference has been made to a preferred embodiment and illustrative advantages of the invention. Those skilled in the art, however, and familiar with the instant disclosure of the present invention, may recognize additions, deletions, modifications, substitutions and/or other changes which will fall within the purview of the claims of the present invention.

BRIEF DESCRIPTION OF THE DRAWINGS

The following is a detailed description of the preferred embodiment of the present invention taken in conjunction with the accompanying drawing where.

DETAILED DESCRIPTION OF THE PREFERRED EMBODIMENT

Figure 1:
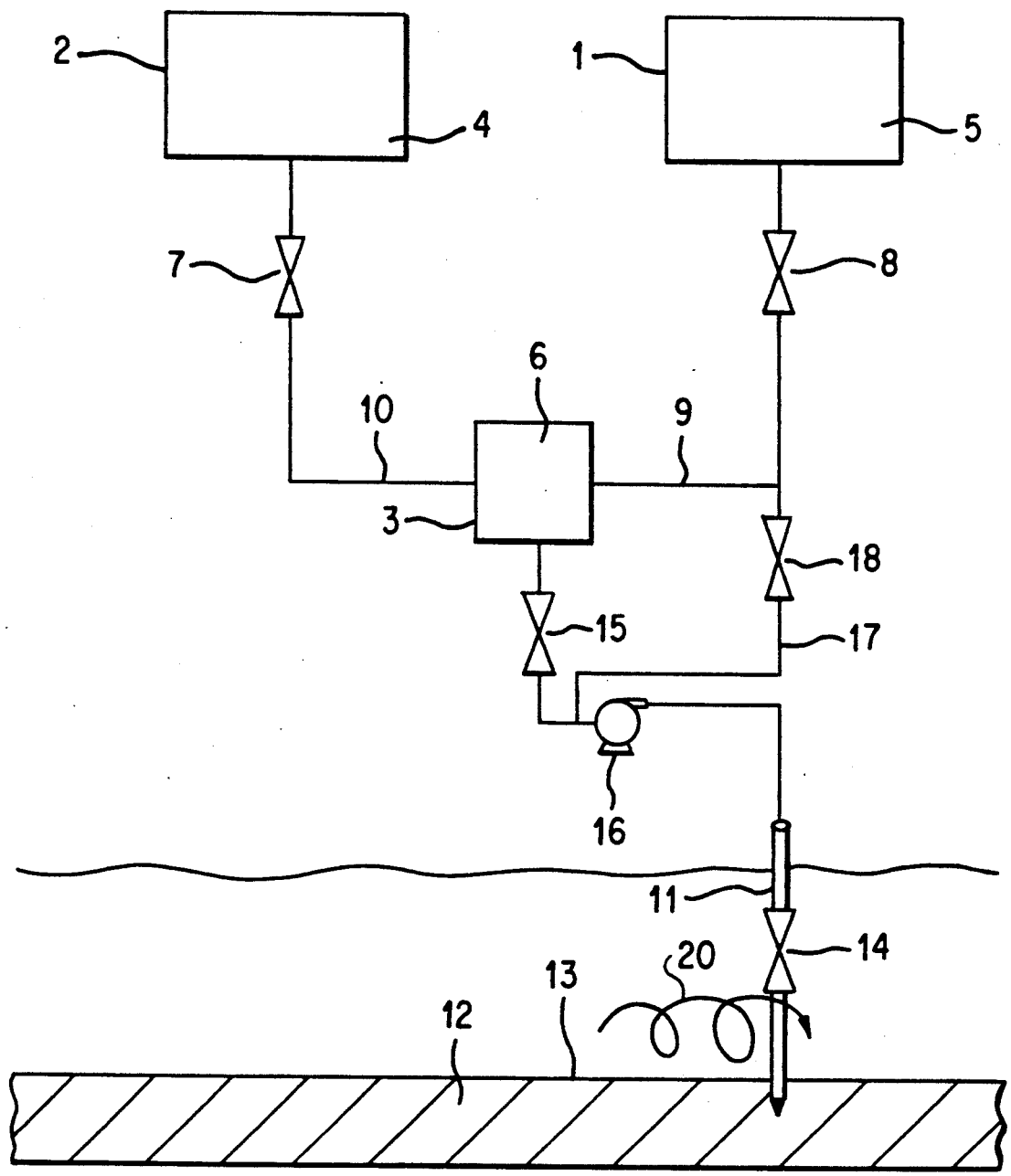
FIG. 1 is a schematic diagram depicting integral components of the subject conveyance and preparation system used in the subject method.

FIG. 1 shows the integral components of the cement placement and concrete production system used in the subject method. For illustrative purposes, a polyethyleneglycol of low molecular weight is considered as the liquid vehicle (carrier) and hydraulic cement as the cement element of concrete. As used herein, the term "liquid vehicle" means any liquid capable of carrying or transporting the unreacted cement. Also for illustrative purposes, the region beneath the aquatic floor is considered as the placement site and is comprised of an aggregate mass of sand. The integral parts of the system include a supply container 1 for the polyethyleneglycol carrier 5 and separate supply container 2 for hydraulic cement 4, each connected to a mixer 3 via pipe assemblies 9 and 10 respectively.

The first phase of the subject method invention involves, in general, the mixing of a polyethyleneglycol 5 and hydraulic cement 4 to form a suspension 6. First, valve 8 is opened and polyethyleneglycol 5 is conveyed through pipe assembly 9 to mixer 3. Next, valve 7 is opened and hydraulic cement is conveyed through pipe assembly 10 to mixer 3. The mixer 3 is an agitated vessel or an in-line mixer.

Alternatively, the mixer 3 is of the batch type in which a definite quantity of polyethyleneglycol and hydraulic cement is mixed to form a suspension 6 which will subsequently be discharged at the completion of mixing. The mixing is performed by a series of revolving blades or baffles inside the mixer 3.

FIG. 1 also shows a feed pipe 11. Pipes of appropriate diameter and length will be used. The joints of each pipe section are connected by pipe coupling-flanges with gaskets and are watertight. The feed pipe 11, which has an open or perforated end, must be adequately supported and arranged so it can be raised and lengths of pipe can be removed if necessary as the level of the aquatic floor 13 changes. Where appropriate, flexible pipe may be used. Furthermore, a series of feed pipes or several systems can be used for larger jobs.

The second phase of the subject method invention involves the evacuation of any water present in feed pipe 11. All water be eliminated from the feed pipe 11 to prevent washing of the hydraulic cement 4 from the suspension 6 and/or reaction of the hydraulic cement 4 with water which can cause premature curing and feed pipe blockage. Water evacuation is accomplished by flushing pipe 11 with polyethyleneglycol 5 and/or, in the alternative, with compressed air or other gases. A slight lifting of the feed pipe 11 off of the aquatic floor 13 should be implemented to facilitate water evacuation through its terminal end. Another alternative involves the use of an air operated control valve 14 placed in feed pipe 11 to prevent infiltration of water during feed pipe placement under water. The valve 14 is opened upon discharge of suspension 6.

Upon evacuation of water from feed pipe 11, phase three can be implemented. Here, the terminal end of feed pipe 11 should be inserted into the subsurface region 12 of aggregate sand to the preferred depth. Valve 15 is opened and the suspension 6 is conveyed at a constant rate and without interruption through feed pipe 11 via positive displacement pump 16 into the subsurface region 12 comprised of aggregate sand. When the suspension 6 is injected into the sand aggregate mass 12, the polyethyleneglycol carrier 5 diffuses into surrounding water above the aquatic floor 13 and the remaining hydraulic cement 4 reacts with the aggregate sand 12 and water present at the site until the mixture cures to form concrete. Pipe 17 and valve 18 are provided so that PEG can be used to flush the underwater pipes.

Suspension delivery is continued as feed pipe 11 is moved laterally through the sand aggregate mass 12, in a controlled swirling manner, as shown by arrow 20 in FIG. 1, by impeller or by other means. Circumstances may favor moving it in a non-linear pattern. Movement in either fashion also provides loosening and controlled agitation of the aggregate.

What is claimed is:

1. A method for the in situ information of concrete within a hydrated aggregate mass in a subsurface region under water, which method comprises:
   a) creating a suspension of cement particles in a nonreactive, environmentally safe liquid vehicle, by
      i) conveying said nonreactive, environmentally safe liquid vehicle into a mixer;
      ii) conveying cement to said mixer; and,
      iii) mixing said nonreactive, environmentally safe liquid vehicle and cement together until particles of said cement are suspended in the liquid vehicle;
   b) conveying the suspension of step (a) to a subsurface aggregate mass at an underwater placement site through a feed pipe having an outlet end within said aggregate mass;
   c) diffusing said suspension into said aggregate mass, by
      i) inserting the outlet end of said feed pipe into the subsurface aggregate mass to a preferred depth;
      ii) continuously discharging said suspension through the outlet end of said feed pipe; and,
      iii) continuously moving said feed pipe through the aggregate mass in a controlled manner, thereby providing agitation;
   d) permitting said nonreactive, environmentally safe liquid vehicle to disperse from said suspension into the surrounding water; and,
   e) permitting the cement to react with water in the aggregate mass, thereby causing the mixture of cement, water, and aggregate to become concrete within the subsurface region of an underwater placement site.

2. The method of claim 1, wherein the cement is hydraulic cement.

3. The method of claim 1, wherein the nonreactive environmentally safe liquid vehicle is polyethyleneglycol.

4. The method of claim 1, wherein the aggregate mass consists, in principle part, of sand.

* * * * *